United States Patent [19]

Svarz

[11] 4,058,458

[45] Nov. 15, 1977

[54] REMOVAL OF COLOR FROM PAPER MILL WASTE WATERS

[75] Inventor: Jerry J. Svarz, La Grange, Ill.

[73] Assignee: Nalco Chemical Company, Oak Brook, Ill.

[21] Appl. No.: 637,976

[22] Filed: Dec. 5, 1975

[51] Int. Cl.$^2$ ............................................. C02C 1/40
[52] U.S. Cl. ...................................... 210/52; 162/29; 210/53; 210/54
[58] Field of Search .................... 162/189, 190, 29; 210/42, 47, 51–54

[56] References Cited

U.S. PATENT DOCUMENTS

| | | | |
|---|---|---|---|
| 2,315,734 | 4/1943 | Ralston et al. | 210/54 |
| 2,862,880 | 12/1958 | Clemens | 210/54 |
| 3,129,170 | 4/1964 | Ittlinger | 210/54 |
| 3,227,650 | 1/1966 | Bell | 210/53 |
| 3,372,129 | 3/1968 | Phillips | 210/54 |
| 3,412,018 | 11/1968 | Monzie | 210/54 |
| 3,509,047 | 4/1970 | Rushton | 210/54 |
| 3,578,587 | 5/1971 | Kemmer | 210/52 |

Primary Examiner—Wilbur L. Bascomb, Jr.
Assistant Examiner—Peter A. Hruskoci
Attorney, Agent, or Firm—Richard L. Johnston

[57] ABSTRACT

Color is removed from paper mill waste water by a precipitation method using relatively small amounts of alkylated and acylated amines and quaternary compounds thereof under acidic conditions as a complexing agent and precipitant for color bodies in such waste waters.

10 Claims, No Drawings

REMOVAL OF COLOR FROM PAPER MILL WASTE WATERS

BACKGROUND

It is generally recognized that the amount of organic material in the form of BOD (biological oxygen demand), COD (chemical oxygen demand), and color bodies currently being discharged into public water supplies from pulp and paper mills is a problem of increasing importance in water pollution.

In the manufacture of paper, cellulose from both hard woods and soft woods is converted to pulp by various processes such as the sulfite process and the sulfate process and the pulp is subjected to various treatments particularly bleaching which involve the use of chemical reagents such as chlorine, chlorine dioxide, sodium hypochlorite and caustic alkalis. As a result of these treatments, the paper making process produces highly colored effluents. The bleaching of the pulp, in particular the caustic extract effluent, is a major contributor to pollution problems.

Lignin is a primary source of color in the pulp. Chlorination of the pulp during the bleaching operation results in the formation of color bodies which are leached from the pulp by caustic alkali solutions. Thus, the caustic extract effluent contains a major proportion of the color bodies and other organic materials which have to be disposed of in waste water treatment.

Several processes are now used or advocated for use in removing color from paper mill waste. One of these is the so-called "massive lime process". This process utilizes lime in quantities ranging from 5,000 to 20,000 parts per million (ppm) to remove by coagulation and sedimentation techniques the organic colored bodies from paper mill wastes.

Another process which is disclosed in U.S. Pat. No. 3,412,018 involves the use of certain types of water insoluble amines in combination with a diluting agent which is non-miscible in water and which has a dielectric constant, measured at 20° C., of less than 4.8 in order to form substantially water insoluble organophilic amine complexes which are extracted by the organic phase. The organic phase is thereafter decanted and separated from the aqueous phase, the amine complex is precipitated from the organic phase and the amine and non-miscible diluting agent are recovered from the organic phase and recycled for further use in the process. This process involves the use of a very substantial amount of the water insoluble amine as well as substantial amounts of organic solvent. Thus, as reported by the patent, the amount of amine employed should be at least 0.5% by volume which would be in excess of 5,000 ppm with respect to the total amount of water treated. The amount of organic solvent is at least 5% by volume with respect to the amount of water treated which would normally correspond to in excess of 50,000 ppm.

The foregoing amine-solvent extraction process has been investigated extensively and is reported to have a number of disadvantages including residual odors from the organic solvents and the tendency for emulsion formation during the treatment and regenerating steps of the process causing excessive loss of amine from the process in the formation of emulsions in the various intermediate steps of the process.

OBJECTS

One of the objects of the present invention is to provide a precipitation process for removal of color bodies from paper mill waste waters and bleachery effluents wherein relatively small amounts of organic compounds are employed and no organic solvent is required.

A further object of the invention is to provide a process of the type described which can be carried out with readily available raw material. Other objects will appear hereinafter.

BRIEF SUMMARY OF THE INVENTION

In accordance with the invention it has been found that color bodies can be removed from paper mill waste waters by adding to such waste waters under acidic conditions, preferably at a pH within the range of about 2 to about 5, and in most instances within the range of 2 to 3.5, a relatively small amount of an alkylated or acylated amine (or amide) or a quaternized form thereof, or mixtures thereof containing at least four carbon atoms in a hydrocarbon group linked to nitrogen, the amount used being sufficient to form a complex with the color bodies in the waste waters which is insoluble in and can be separated from the waste waters by settling or filtration. The compounds employed for the purpose of the invention can be used in amounts as low as 20 ppm with respect to the waste water or bleachery effluent and, in most cases, will not exceed 2,000 ppm, depending upon the particular compound employed.

DETAILED DESCRIPTION OF THE INVENTION

The invention is particularly applicable to pulp mill bleachery waste waters which are obtained as a result of bleaching processes applied to the pulp wherein chlorine, chlorine dioxide or sodium hypochlorite are employed and the pulp is treated with caustic alkali solutions (i.e., sodium hydroxide solutions) which extract the color bodies and produce a highly colored effluent. It is essential for the purpose of the process that the pH of this effluent be reduced to a pH within the range of 2 to 5 and preferably around 2.5 to 3.5. In a typical paper mill plant the waste waters from the whole mill might total 25,000,000 to 30,000,000 gallons per day and the bleachery waste waters would constitute a smaller proportion of the total, say, 1,000,000 to 6,000,000 gallons per day. The invention can be used to treat all of the waste waters but it is usually more practical and more essential to treat the bleachery waste waters in order to remove or to reduce to a minimum the color bodies therein.

The present invention is based on the discovery that relatively small amounts of compounds of the type previously mentioned will combine with the color bodies in the aforementioned waste waters under acidic conditions and that the resultant color body complex is insoluble and can be removed as solids. In other words, the present process is not an extraction process but depends upon the use of relatively small amounts of compounds which will form water insoluble solid complexes with the color bodies in the waste water which can be removed by precipitation and settling or by filtration.

Examples of compounds suitable for the practice of the invention are:

a. Alkylated amines and quaternary compounds thereof obtained by reacting a hydrocarbon halide with an amine, e.g.,

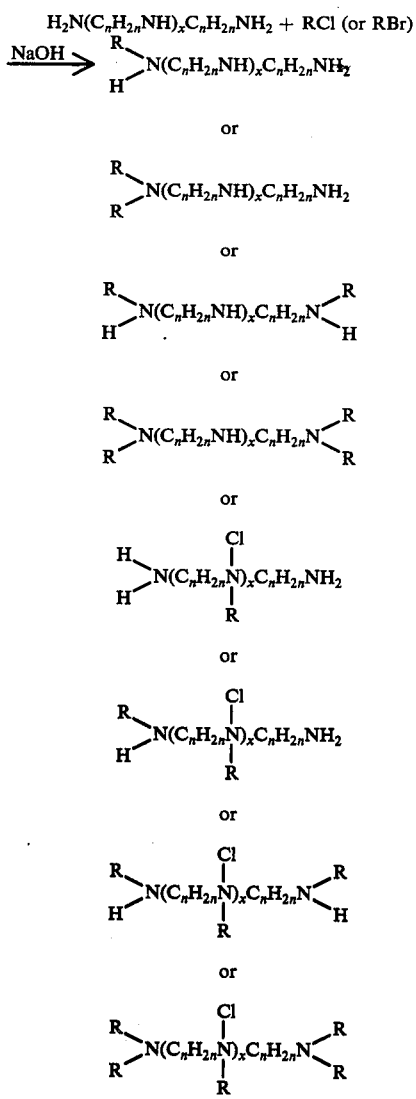

or mixtures of such compounds, where $n$ is 1 to 6 and $x$ is 0 or an integer. Thus, when $n$ is 2 and $x$ is 0 the starting amine is ethylene diamine; when $n$ is 2 and $x$ is 1 the starting amine is diethylene triamine; when $n$ is 2 and $x$ is 2 the starting amine is triethylene tetramine; when $n$ is 2 and $x$ is 3, the starting amine is tetraethylene pentamine. The aforesaid amines are water soluble. Amines having higher molecular weights which are water soluble can be obtained by condensing ethylene dichloride with ammonia or ethylene diamine to produce polymers having molecular weights of 300 or more, as described in U.S. Pat. No. 3,372,129. Such polymers can then be further reacted with hydrocarbon monohalides (e.g., RCl or RBr) to give alkylated amines suitable for the practice of the invention.

b. Acylated amines or amides obtained by reacting a monoamine R–NH$_2$ or a polyamine of the type previously described with a hydrocarbon acid chloride RCOCl of bromide RCOBr, e.g.,

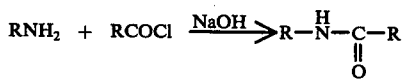

or by reacting an amine with an acid to produce an acid salt and heating to eliminate water. Azeotropic solvents such as toluene or xylene can be used in this reaction.

In the foregoing formulae, R should be a hydrocarbon group containing at least 4 carbon atoms, preferably 4 to 24 carbon atoms, e.g., butyl, isobutyl, amyl, hexyl, benzyl or heptyl, as well as higher hydrocarbon groups containing 8 to 24 carbons, including octyl, nonyl, decyl, dodecyl, tetradecyl, hexadecyl, and octadecyl. The hydrocarbon groups can be saturated or unsaturated such as, for example, oleyl.

In carrying out the process the low pH can be achieved by blending acidic chlorination effluent from the bleachery process with caustic extraction effluent or the caustic extraction effluent can be acidified with sulfuric acid or waste liquor containing sulfuric acid.

The invention has been evaluated by mixing the waste waters with the alkylated and acylated amines, removing the solids and comparing the clarified effluent or filtrate with the waste water prior to the treatment. This comparison was carried out in two ways, (1) using a Gardner Holt colorimeter and observing the readings, and (2) obtaining color readings in terms of APHA units. The treated samples were centrifuged or filtered through No. 40 filter paper to remove floc and the filtrates or centrifugates were adjusted to pH 7 before color readings were taken. The raw effluents used in the test were adjusted to pH 7 and then filtered through a millipore filter before color readings were made to get a base line reading on original color.

The invention will be further illustrated but is not limited by the following examples in which the quantities are given by weight unless otherwise indicated.

EXAMPLE I

A hexamide was prepared by reacting 10 parts of a solution of a polymer of ethylenedichloride and ammonia prepared as described in U.S. Pat. No. 3,372,129 containing 39% solids with 9.38 parts of hexanoyl chloride in the presence of 5.6 parts of a 50% sodium hydroxide solution. The acid chloride was added to the mixture slowly with stirring at a temperature of 45° C. The sodium hydroxide solution was then added and the whole mixture was allowed to stand for several days. A layer comprising the hexamide of the polyamine polymer was tested on a paper mill bleachery extract at a pH of 3.0 having an APHA color of 3500–4000 by mixing 200 ppm of the hexamide and then 400 ppm of the hexamide with said extract and separating the solids. A color reduction of 86% and 93%, respectively, was obtained.

EXAMPLE II

The procedure was the same as in Example I except that tetraethylenepentamine hexamide was used. This was prepared by reacting 9.3 parts of tetraethylenepentamine with 6.7 parts of hexanoyl chloride in 24 parts of benzene at 60° C. with stirring. This product when tested as described in Example I at dosages of 100, 200 and 400 ppm produced color reduction of 80%, 80% and 83%, respectively.

EXAMPLE III

Tetraethylenepentamine was alkylated with benzyl chloride using 9.3 parts of tetraethylenepentamine and 6.3 parts of benzyl chloride at 50° C. for 2 hours, then heating to 85° C. and holding for 15 hours. A 1% solution in water was tested as described in Example I at a dosage of 200 ppm and 400 ppm and produced a color reduction of 86% and 87%, respectively.

The same alkylated amine was tested on a pine bleachery extract having an APHA color of 20,000 at a pH of 3 and gave a color reduction of 90% and 94% using 300 ppm and 400 ppm of the alkylated amine, respectively.

EXAMPLE IV 18.6 parts of tetraethylenepentamine was alkylated with 19.3 parts of octyl bromide to produce an alkylated polyamine and the resultant product was tested in the same manner described in Example I at dosages of 200 and 400 ppm with a reduction of color in the waste water of 93% and 96%, respectively.

EXAMPLE V

An alkylated polyamine was prepared by reacting 14.6 parts of triethylenetetramine with 19.6 parts of octyl bromide in 70 parts of amyl alcohol with refluxing followed by the addition of 12 parts of 50% sodium hydroxide solution and the resultant alkylated amine was tested at a dosage of 400 ppm in the manner described in Example I with a color reduction of about 90%.

EXAMPLE VI

An alkylated polyamine was prepared by reacting 27.9 parts of tetraethylenepentamine with 20.5 parts of butyl bromide in 20 parts of butyl alcohol. The mixture was refluxed 24 hours with elimination of 4.5 parts of water. 16 parts of a 50% by weight aqueous solution of sodium hydroxide was added at the end of the refluxing and the sodium bromide was filtered off and the salt cake washed with acetone. The alkylated amine was stripped from the acetone and tested at dosages of 200 and 400 ppm in the manner described in Example I with a reduction of color in the waste water of 80% and 83%, respectively.

EXAMPLE VII

An alkylated polyamine was prepared by reacting 14.6 parts of triethylenetetramine with 19.6 parts of octyl bromide in 70 parts of amyl alcohol with the addition of 8 parts of a 50% by weight solution of sodium hydroxide. All of the ingredients were mixed and heated at reflux for 8 hours. The mixture was then filtered and the solvent distilled off. The octyl triethylenetetramine was recovered and tested at dosages of 200 and 400 ppm in the manner described in Example I with color reduction of the waste water of about 93% and 94%, respectively, at pH 3.

EXAMPLE VIII

An alkylated polyamine was prepared by reacting 18.6 parts tetraethylenepentamine and 17.3 parts octyl bromide in 30 parts amyl alcohol with the addition of 8 parts of a 50% by weight solution of sodium hydroxide. The reactants were mixed and heated at reflux for 20 minutes at a temperature of about 138° C. The sodium bromide was then filtered off and the alkylated polyamine was recovered and tested at a dosage of 700 ppm on a pine bleachery extract having an APHA color of 20,000. A 92% reduction in color was obtained, at pH 3.

EXAMPLE IX

A hexamide was prepared by reacting 9.3 parts of tetraethylenepentamine with 6.7 parts of hexanoyl chloride in 24 parts of benzene at 60° C. with stirring. The benzene was stripped off and the hexamide was tested on a pine bleachery extract having an APHA color of 20,000 at a dosage of 600 ppm. A color reduction of 94% was obtained, at pH 3.

EXAMPLE X

An octanomide was prepared by reacting 9.3 parts of tetraethylenepentamine and 7.2 parts of octanoic acid in 20 parts of benzene. The acid was added gradually and the temperature raised to 34° C. The mixture was slowly heated over a one hour period at 200° C. and held for 10 minutes with elimination of water. The resultant amide was then tested at a dosage of 700 ppm on a pine bleachery extract having an APHA color of 20,000 and produced a color reduction of 87.5%, at pH 3.

EXAMPLE XI

An amide was prepared by reacting 29.2 parts of triethylenepentamine and 40 parts of coconut fatty acids in 100 parts of xylene. The coconut fatty acid was added over a period of 20 minutes at 30° C. The mixture was then refluxed with the elimination of 4.1 parts of water. The xylene was stripped off and the resultant amide comprising principally laurylamide of triethylenetetramine was tested at a dosage of 1000 ppm on a pine bleachery extract having an APHA of about 20,000. A color reduction of 91% was obtained, at pH 3.

EXAMPLE XII

The diethylacetamide of tetraethylenepentamine was prepared by reacting 9.3 parts of tetraethylenepentamine with 5.8 parts of diethylacetic acid. The reaction was carried out first at room temperature, 30° C., to form the amine salt which was then heated to 200° C. over a one hour period with the elimination of an aqueous distillate. The resultant amide was a thick orange oil which was made up as a 10% solution in isopropanol. The amide was tested on a bleachery extract of the type described in Example I at a pH of 3.0 and produced a 77% color reduction at 100 ppm and at 200 ppm.

EXAMPLE XIII

A lauryl amide of a polymer of ethylene dichloride and ammonia prepared as described in U.S. Pat. No. 3,372,129, was prepared by reacting 10 parts of the polymer in 39% aqueous solution with 1.5 parts of lauroyl chloride. The polymer solution was heated to 50° C. and the lauroyl chloride was slowly added. The mixture was then stirred and heated to 80° C. and held for 15 minutes. The product was tested on a pine bleachery extract under the conditions described in Example I at a dosage of 200 and 400 ppm and produced a color reduction of 94% and 96%, respectively, at pH 3.

EXAMPLE XIV

The diethylacetamide of tetraethylenepentamine as described in Example I was tested on a pine bleachery extract having a color value of 20,000 APHA units at a pH of 3 and a dosage of 300 ppm with the addition of 50 ppm of an anionic copolymer of acrylamide and sodium acrylate containing 70% acrylamide and 30% sodium acrylate. A color reduction of 90% was obtained.

EXAMPLE XV

An amide was prepared by reacting 40 parts of tetraethylene pentamine and 56 parts of tall oil acids in 100 parts of xylene. The tetraethylenepentamine was dissolved in the xylene and the tall oil acids added slowly with good agitation. The mixture was brought to reflux and water was eliminated. The resultant amide was used for color removal at a dosage of 6— to 80 ppm from a 1% aqueous solution on a pine bleachery extract of the type described in Example I at a pH of 3.

It should be understood that the proportions of the various additives may vary to some extent depending upon the composition of the particular paper mill waste water. The process is particularly useful for removing color from softwood and hardwood paper pulp bleachery effluents where the content of color bodies is relatively high. It may not always be practical from an economical standpoint to use the process on the total effluent. The treatment can also be used not only for the purpose of reducing color in paper pulp waste waters but also for reducing total solids and for reducing total suspended solids.

Combination treatments can also be used in which a primary treatment of the waste water with a compound of the type described is followed by a secondary treatment wherein the waste water from which color complex solids have been partially removed is mixed with a water insoluble primary, secondary or tertiary amine or quaternized form thereof, or mixtures thereof, containing at least eight carbon atoms in a hydrocarbon group linked to nitrogen of the amine, preferably 8 to 24 carbon atoms, e.g., octyl amine, dodecyl amine, stearyl amine or oleyl amine or other fatty amine. Additional solids are formed and then removed by filtration or settling, thereby enhancing the clarity of the waste water. The amounts of amine used in the secondary treatment are usually within the range of 10 ppm to 1000 ppm.

Another type of combination treatment of waste water involves addition to the waste water of the alkylated and/or acylated amine and a water soluble anionic coagulating linear polymer of an olefinic hydrocarbon containing carboxy or carboxy and amide side chains, e.g., polymers of sodium acrylate and acrylamide obtained by copolymerizing 10–90% by weight sodium acrylate and 90–10% by weight acrylamide.

For the purpose of this invention the expressions "acylated amine" and "amide" are synonymous and are intended to cover compounds containing a

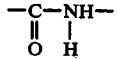

group. The alkylated amines contain no oxygen, only carbon, hydrogen and nitrogen.

The invention is hereby claimed as follows:

1. A process for removing color from cellulose paper pulp waste water wherein color bodies are present due to chemical reaction on or degradation of lignin which consists essentially of adjusting the pH of said waste water to a pH within the range of 2 to 5 and mixing with the resultant waste water a compound from the group consisting of alkylated and acylated amines, quaternized forms of such alkylated and acylated amines, and mixtures thereof, said compound containing at least 4 carbon atoms in a hydrocarbon group linked directly to nitrogen or linked to nitrogen through a carbonyl group and being effective to combine with said color bodies to form solids which can be separated from said waste water, the amount of said compound being within the range of 20 ppm to 2000 ppm of said waste water, and separating the resultant solids.

2. A process as claimed in claim 1 in which the pH is within the range of 2 to 3.5.

3. A process as claimed in claim 1 in which at least one said hydrocarbon group in said compound contains from 4 to 24 carbon atoms.

4. A process as claimed in claim 1 in which said compound is an alkylated polyamine, at least one said hydrocarbon group in said compound contains from 4 to 8 carbon atoms, and the polyamine which is alkylated is water soluble.

5. A process as claimed in claim 1 in which said compound is an acylated amine containing 4 to 24 carbon atoms in the hydrocarbon group.

6. A process as claimed in claim 1 in which said compound is in a quaternized form.

7. A process as claimed in claim 1 in which said compound comprises a mixture of alkylated amines and quaternary forms thereof.

8. A process as claimed in claim 1 in which said compound is an alkylated polyamine selected from the group consisting of ethylenediamine, diethylenetriamine, triethylenetetramine, tetraethylenepentamine, polymers of ethylene dichloride and ammonia and polymers of ethylene dichloride and ethylenediamine, alkylated so as to contain at least one hydrocarbon group containing 4 to 8 carbon atoms linked to nitrogen of an amine group.

9. A process as claimed in claim 1 in which said compound is an acylated amine containing at least one

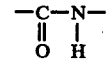

group in which the nitrogen is linked to a hydrocarbon group containing 4 to 24 carbon atoms.

10. A process as claimed in claim 1 in which said waste water, after being separated from said solids, is given a secondary treatment with an amine containing at least 8 carbon atoms in a hydrocarbon group linked to nitrogen of the amine.

* * * * *

UNITED STATES PATENT AND TRADEMARK OFFICE
CERTIFICATE OF CORRECTION

PATENT NO. : 4,058,458
DATED : November 15, 1977
INVENTOR(S) : JERRY J. SVARZ

It is certified that error appears in the above-identified patent and that said Letters Patent are hereby corrected as shown below:

Column 6, line 22, "triethylenepentamine" should read --triethylenetetramine--.

Signed and Sealed this

Fourteenth Day of March 1978

[SEAL]

Attest:

RUTH C. MASON
Attesting Officer

LUTRELLE F. PARKER
Acting Commissioner of Patents and Trademarks